(No Model.)  2 Sheets—Sheet 1.

S. B. DRIGGS.
CAR TRUCK.

No. 267,335.  Patented Nov. 14, 1882.

WITNESSES:
Francis McArdle.
C. Sedgwick

INVENTOR:
S. B. Driggs
BY Munn & Co
ATTORNEYS.

(No Model.) S. B. DRIGGS. 2 Sheets—Sheet 2
CAR TRUCK.
No. 267,335. Patented Nov. 14, 1882.
Fig. 3.
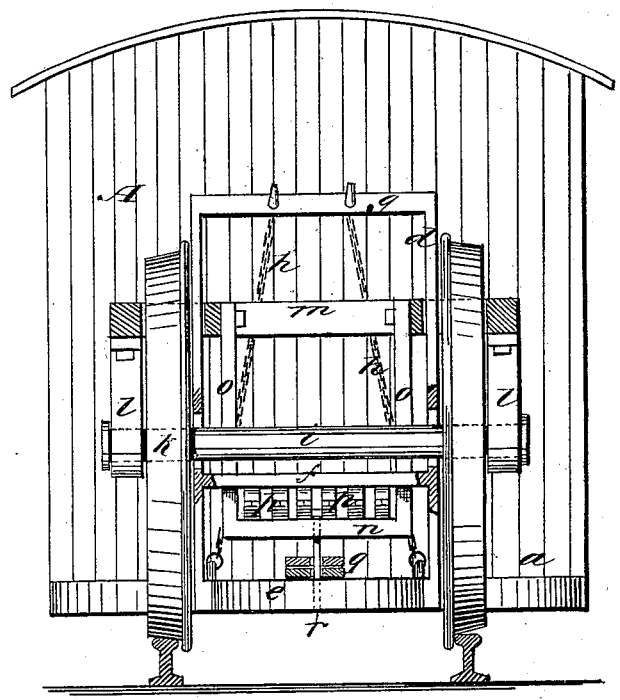
Fig. 4
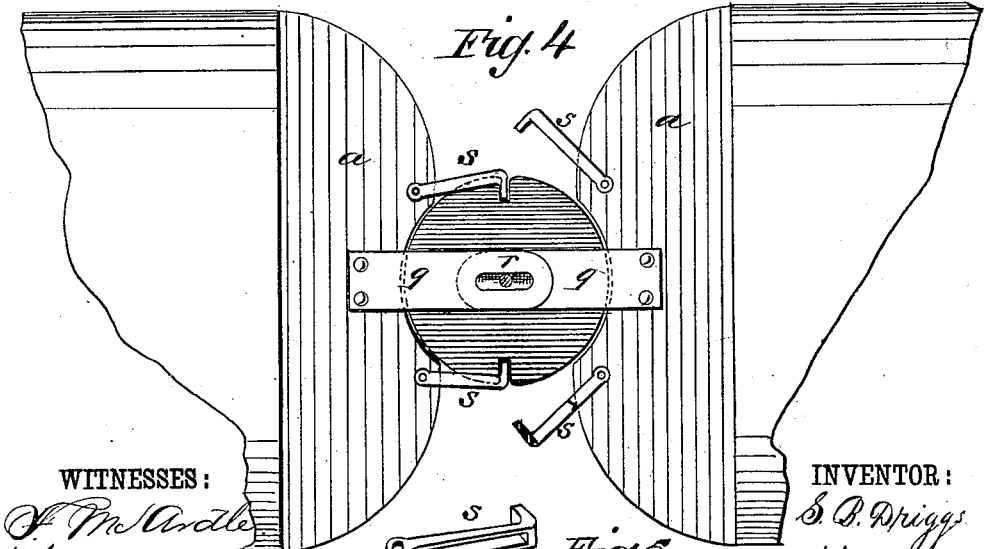
Fig. 5
WITNESSES: INVENTOR:
S. B. Driggs
BY
ATTORNEYS.

UNITED STATES PATENT OFFICE.

SPENCER B. DRIGGS, OF NEW YORK, N. Y.

CAR-TRUCK.

SPECIFICATION forming part of Letters Patent No. 267,335, dated November 14, 1882.

Application filed March 13, 1882. (No model.)

*To all whom it may concern:*

Be it known that I, SPENCER B. DRIGGS, of the city, county, and State of New York, have invented a new and useful Improvement in Railroad Trucks and Cars, of which the following is a full, clear, and exact description.

The object of my invention is to provide for the transportation of freight over railroads at increased speed over what is possible with cars of ordinary construction, and, further, to diminish the power required to draw the cars at the desired speed. To these ends I dispense with the ordinary trucks and small wheels, which waste by friction a large percentage of the power, and in place thereof suspend the cars from trucks placed between the several cars of the train and mounted on wheels of large diameter, thereby reducing the friction to a minimum, and utilizing nearly the whole momentum of the train.

The details of construction are hereinafter described and claimed, reference being had to the accompanying drawings, forming part of this specification, in which similar letters of reference indicate corresponding parts in all the figures.

Figure 1:
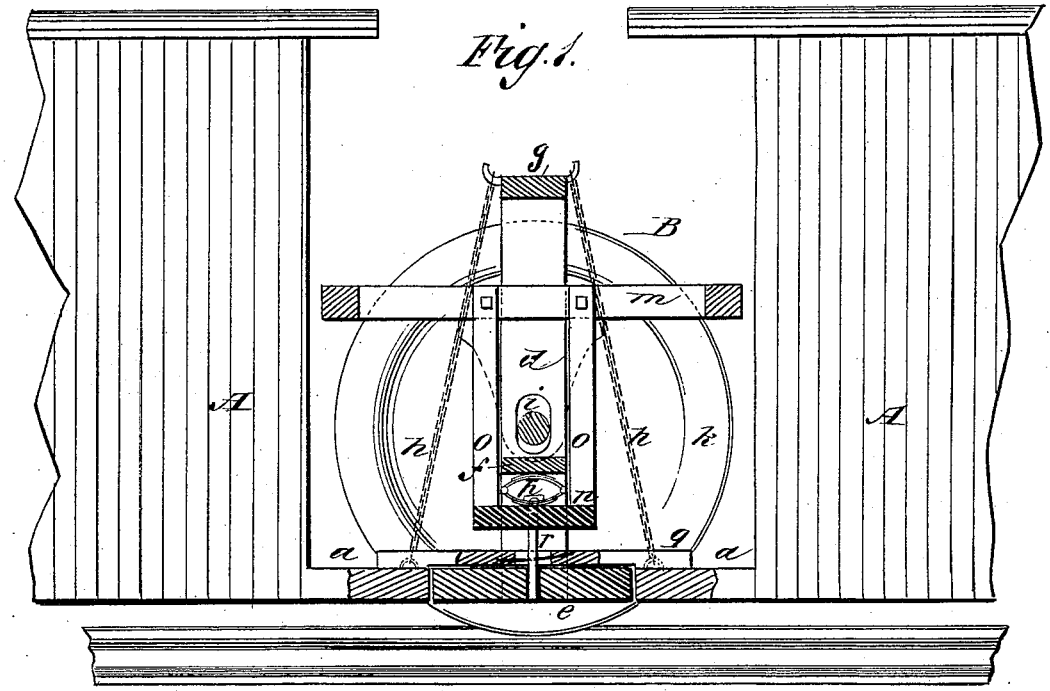
Figure 2:
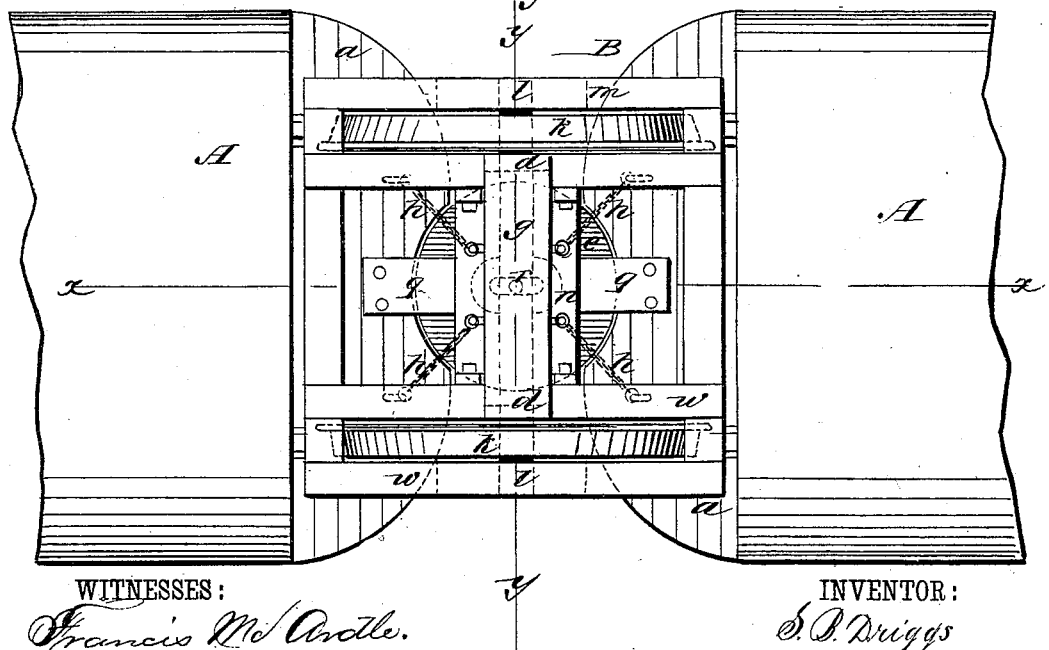

Figure 1 is a sectional side view of cars with my improvements. Fig. 2 is a plan view. Fig. 3 is a transverse section on line $y\ y$ of Fig. 2, and Fig. 4 is a horizontal section.

A A are cars having platforms $a$, and B is the truck between the two cars, from which they are suspended. A similar truck is to be placed between the ends of all the cars in a train, and also one at the forward and another at the rear end of the train, so that the whole train is suspended and sustained by the trucks at a uniform height. Preferably the bottoms of the cars will be dropped as low as the under side of the ordinary truck-frame, and there being no obstructions on the car-bottoms they may go still lower, so as to save work in loading and unloading as much as possible.

The construction of the saddle-truck or suspension-frame and trucks is as follows:

$d\ d$ are standards securely fixed on a circular plate or table, $e$, and tied by cross-timbers $f\ g$. These parts constitute the saddle-truck or suspension-frame proper, on which the cars are hung by chains $h$ from the upper timbers, $g$, to the platforms $a$. The table is level with the platforms, and the latter are cut in to fit the table, so that the cars may be brought closely together.

$i$ is the axle mounted on flanged wheels $k\ k$. $l\ l$ are pedestals resting by suitable boxes on the ends of axle $i$, and supporting a rectangular frame, $m$, of timbers outside of and between the wheels, and which constitutes the truck-frame proper.

$n$ is a platform sustained rigidly by hangers $o$ from frame $m$, between the wheels and below the cross-bar $f$ of the saddle-truck or suspension-frame; and $p\ p$ are springs of suitable character between platform $n$ and cross-bar $f$, the weight of the saddle-truck or suspension-frame, and consequently of the cars, being thus sustained by the spring. The axle $i$ passes through the side standards, $d\ d$, and the opening is elongated to allow vertical play.

From the platform $a$ of each car a plate, $q$, extends over the table $e$, and the ends of these plates are beveled to lap one upon the other, and slotted to receive a coupling-pin. The pin shown at $r$ extends from the upper side of platform $n$ through the plates $q\ q$ and through the center of the table $e$, so that it serves as a center pin on which the truck swings, and also prevents separation of the cars beyond what is allowed by the length of the slots in plates $q$. The platforms $a$ are also provided, as shown in Fig. 4, with hooks $s\ s$, to engage notches in the edge of table $e$, and thereby allow connection of the table to the platform of the forward car, so that the table and truck shall be swung to the curve on which the car may be moving. The hooks $s$, as shown most clearly in Fig. 5, are forked or slotted to pass upon the edges of table $e$, so that they may hold more securely and not be displaced by vibration. Either set of hooks is used, according to the direction the train is moving, the change being readily made as required.

The advantages of this construction are obvious, and, briefly stated, are as follows: The friction is first largely done away with by the reduction in the number of wheels used, and, secondly, by the use of large wheels and the consequent reduction in the speed of the wheels in traveling a given distance. Further, the momentum of the loaded cars being exerted on large wheels, the leverage is correspondingly lengthened and the force exerted more directly in the direction the train is moving, instead of downward, as is the case with small wheels. Further, the expense of construction and repairs is much less, and the cars being independent of the trucks they are not thrown out of use while the trucks are being repaired. The arrangement is such that high rates of speed can be obtained with comparatively little power. There will be no necessity of raising the outer rails of the track at curves, as generally practiced, to neutralize the centrifugal force, as the tendency of the truck is to run upon the inner side of the curve. The connections are flexible in all directions, and consequently the trucks are free to adapt themselves perfectly to the curves.

Having thus fully described my invention, I claim as new and desire to secure by Letters Patent—

1. A two-wheel truck adapted to be placed between two adjacent cars, and to have the cars suspended therefrom by flexible connections, substantially as herein shown and described.

2. The combination, with two adjacent cars, of the two-wheel truck B and the chains $h$, connected to the platforms of the cars and to the yielding saddle-truck or suspension-frame of the said truck, substantially as and for the purpose set forth.

3. The combination of a saddle-truck or suspension-frame consisting of table $e$, standards $d$, and cross-timbers $f$ $g$, the truck-frame $l$ $m$ $n$ $o$, axle $i$, wheels $k$, and springs $p$, substantially as shown and described.

4. The combination, with the recessed platforms $a$ of the cars A, of the circular table $e$, the standards $d$, the cross-timbers $f$ $g$, the axle $i$, wheels $k$, and the chains $h$, substantially as and for the purpose set forth.

5. The combination of coupling-plates $q$, table $e$, and bolt $r$ with the truck and suspension-frames, substantially as shown and described.

6. The hooks $s$, combined with the turn-table $e$ and truck-frame, substantially as and for the purposes set forth.

SPENCER B. DRIGGS.

Witnesses:
C. SEDGWICK,
D. M. HOLDREDGE.